(12) United States Patent
Satoh et al.

(10) Patent No.: US 6,194,061 B1
(45) Date of Patent: *Feb. 27, 2001

(54) THERMOPLASTIC LAMINATE FILM

(75) Inventors: Masayoshi Satoh; Chikao Morishige; Shinya Higashiura; Hiroshi Taki, all of Ohtsu (JP)

(73) Assignee: Toyo Boseki Kabushiki Kaisha, Osaka (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/317,718

(22) Filed: May 25, 1999

(30) Foreign Application Priority Data

| May 25, 1998 | (JP) | 10-143248 |
| May 29, 1998 | (JP) | 10-149869 |
| Jun. 2, 1998 | (JP) | 10-152954 |
| Jun. 18, 1998 | (JP) | 10-170795 |
| Jun. 29, 1998 | (JP) | 10-182658 |

(51) Int. Cl.[7] ................................................. B32B 27/36
(52) U.S. Cl. .................. 428/341; 428/423.1; 428/423.5; 428/423.7; 428/424.6; 428/424.8; 428/480; 428/483; 428/910
(58) Field of Search ................................... 525/437, 440, 525/445; 428/480, 483, 423.1, 423.5, 423.7, 424.6, 424.8, 910, 341

(56) References Cited

U.S. PATENT DOCUMENTS

| 4,009,312 | * | 2/1977 | Hayashi et al. | 428/213 |
| 4,025,471 | * | 5/1977 | Takahashi | 260/16 |
| 4,151,148 | * | 4/1979 | Chasin et al. | 260/29.6 |
| 4,250,274 | * | 2/1981 | Damico et al. | 525/127 |
| 5,194,327 | * | 3/1993 | Takahashi et al. | 428/327 |
| 5,300,563 | | 4/1994 | Kiang et al. | 525/42 |
| 5,859,151 | * | 1/1999 | Eckstein et al. | 525/440 |

FOREIGN PATENT DOCUMENTS 0 686 651 A1   12/1995   (EP).

OTHER PUBLICATIONS

European Search Report for EP Application No. 99110085 dated Jun. 5, 2000.

* cited by examiner

Primary Examiner—D. S. Nakarani
Assistant Examiner—Christopher Paulraj
(74) Attorney, Agent, or Firm—Morrison & Foerster LLP

(57) ABSTRACT

A thermoplastic laminate film containing a thermoplastic substrate film and a layer formed from a resin composition containing a polyester graft copolymer (A) and a resin (B), the layer being formed on at least one side of the thermoplastic substrate film, the polyester graft copolymer (A) being obtained by grafting at least one polymerizable unsaturated monomer, which contains an acid anhydride having a double bond, to a hydrophobic polyester resin, and the resin (B) containing at least one member selected from the group consisting of a polyurethane resin, an acrylic resin and a vinyl resin. The adhesion improving layer of the inventive thermoplastic laminate film shows superior adhesion strength in a broad range of applications. Specifically, it is evident in an ink layer of printing ink, UV ink and the like; an adhesive layer in dry laminate and extrusion laminating; a thin film layer obtained by vacuum vapor deposition, electron beam vapor deposition, sputtering, ionic plating, CVD and plasma polymerization of metal or inorganic substance or oxides thereof; an oxygen moisture absorbent layer; an organic barrier layer; an ink jet image receiving layer and the like.

19 Claims, No Drawings

THERMOPLASTIC LAMINATE FILM

TECHNICAL FIELD OF THE INVENTION

The present invention relates to a thermoplastic laminate film having an improved adhesive property. More particularly, the present invention relates to a thermoplastic laminate film exhibiting superior adhesion between a thermoplastic substrate film and an adhesion improving layer and between the adhesion improving layer and a layer formed thereon such as an adhesive layer for lamination or a thin film layer made from a metal, inorganic compound and oxide thereof, as well as superior resistance to water and solvent.

BACKGROUND OF THE INVENTION

Conventionally, a film made from a thermoplastic resin, such as polyolefin, polystyrene, poly(vinyl chloride), polyester, polyamide and the like, particularly an oriented film made from polypropylene, polyester, polyamide and the like have been widely used for their superior dynamic property, heat resistance, transparency and the like. In particular, a biaxially oriented polyester films are superior in mechanical strength, heat resistance, chemical resistance and dimensional stability, so that they have been used in a wide range of applications, such as a base film for magnetic tape, an insulating tape, a photographic film, a tracing film, a food packaging film and the like. On the other hand, since polyester films generally have poor adhesive property, it is a common practice to subject a polyester film to a corona discharge surface treatment or to form an anchor coating layer, when laminating thereon a layer of magnetic agent, photosensitive agent, mat agent and the like. As such anchor coating agent, a number of materials have been proposed, among which are water soluble or water dispersible polyester or acrylic resin to be used for a film having comparatively higher polarity, which is typically a polyester film (Japanese Patent Unexamined Publication Nos. 54-43017, Japanese Patent Examined Publication No. 49-10243 and U.S. Pat. No. 4,098,952).

The above-mentioned polyester resin is defective in that a film having an anchor coating layer made therefrom is susceptible to blocking when rolled, and the above-mentioned acrylic resin is defective in that an anchor coating layer therefrom sometimes shows insufficient adhesion to a layer to be formed thereon. In an attempt to overcome these drawbacks, it is proposed to use the above-mentioned polyester resin and acrylic resin in mixture (Japanese Patent Unexamined Publication No. 58-124651), though such method does not always satisfactorily compensate for the drawbacks.

It has been also proposed to use various modified polyesters typically represented by one modified by grafting. For example, Japanese Patent Unexamined Publication Nos. 2-3307, 2-171243 and 2-310048 teach that a resin obtained by grafting a compound having an unsaturated bond to a water soluble or water dispersible hydrophilic polyester resin is suitable as an anchor coating agent for a polyester film. Nevertheless, since in such a graft-modified resin, which has been made to have a hydrophilic group in advance in the polyester resin by, for example, copolymerization, the anchor coating layer therefrom is devoid of high adhesive property or water resistance. In such a case, addition of a crosslinking agent or an organic solvent is generally essential for complementing degraded properties.

In addition, Japanese Patent Unexamined Publication No. 3-273015 and U.S. Pat. No. 5,015,169 disclose that a graft-modified polyester resin is useful as an anchor-coating agent for a polyester film. While an anchor coating layer therefrom shows improved adhesive property in a dry state, the resin has poor cohesion, such that the adhesive property of the anchor coating layer under humidity becomes less and the film increasingly suffers from peeling off of a layer formed on the anchor coating layer, development of flaws and the like, as the number of process increases.

It is therefore an object of the present invention to resolve the above-mentioned problems and provide a thermoplastic laminate film having superior adhesion between a substrate film and an adhesion improving layer and between the adhesion improving layer and a layer formed thereon, superior resistance to water and solvent, superior slidability and superior transparency.

Accordingly, the present invention provides the following, (1) A thermoplastic laminate film comprising a thermoplastic substrate film and a layer formed from a resin composition comprising a polyester graft copolymer (A) and a resin (B), the layer being formed on at least one side of the thermoplastic substrate film, the polyester graft copolymer (A) being obtained by grafting at least one polymerizable unsaturated monomer, which comprises an acid anhydride having a double bond, to a hydrophobic polyester resin, and the resin (B) comprising at least one member selected from the group consisting of a polyurethane resin, an acrylic resin and a vinyl resin.

(2) The thermoplastic laminate film of (1) above, wherein the resin (B) is a polyurethane resin, an acrylic resin or a vinyl resin.

(3) The thermoplastic laminate film of (1) above, wherein the resin (B) is a polyurethane resin or an acrylic resin.

(4) The thermoplastic laminate film of (1) above, wherein the resin (B) is a copolymer comprising at least two members selected from the group consisting of a polyurethane resin, an acrylic resin and a vinyl resin.

(5) The thermoplastic laminate film of (1) above, wherein the resin (B) is a copolymer comprising a polyurethane resin and an acrylic resin.

(6) The thermoplastic laminate film of (1) above, wherein the acid anhydride having a double bond is maleic anhydride.

(7) The thermoplastic laminate film of (1) above, wherein the polymerizable unsaturated monomer comprises at least maleic anhydride and styrene.

(8) The thermoplastic laminate film of (1) above, wherein the resin composition further comprises at least one member selected from the group consisting of a wax, an organic particle and an inorganic particle.

(9) The thermoplastic laminate film of (1) above, wherein the resin composition further comprises a static preventive.

(10) The thermoplastic laminate film of (1) above, wherein the resin composition further comprises a surfactant.

(11) The thermoplastic laminate film of (1) above, wherein the resin composition further comprises a crosslinking binder.

(12) The thermoplastic laminate film of (1) above, wherein the hydrophobic polyester resin in the polyester graft copolymer (A) comprises an aromatic dicarboxylic acid in 30–99.5 mol %, an aliphatic dicarboxylic acid and/or an alicyclic dicarboxylic acid in 0–70 mol % and a polymerizable unsaturated double bond-containing dicarboxylic acid in 0.5–10 mol %, as a dicarboxylic acid component.

(13) The thermoplastic laminate film of (1) above, wherein the hydrophobic polyester resin in the polyester graft copolymer (A) comprises an aromatic dicarboxylic acid in 60–99.5 mol %, an aliphatic dicarboxylic acid and/or an alicyclic dicarboxylic acid in 0–40 mol % and a polymerizable unsaturated double bond-containing dicarboxylic acid in 0.5–10 mol %, as a dicarboxylic acid component.

(14) The thermoplastic laminate film of (1) above, wherein the hydrophobic polyester resin in the polyester graft copolymer (A) comprises a hydrophilic group.

(15) The thermoplastic laminate film of (1) above, wherein the hydrophobic polyester resin in the polyester graft copolymer (A) comprises at least aliphatic dicarboxylic acid as a polymerizable component.

(16) The thermoplastic laminate film of (15) above, wherein the layer shows an absorbance ratio (X/Y) of not less than 0.05, the X being a peak absorbance of a carboxylic anhydride group of the acid anhydride in the layer and the Y being a peak absorbance of an ester group derived from the aliphatic dicarboxylic acid.

(17) The thermoplastic laminate film of (15) above, wherein the layer is devoid of adhesive property in a adhesive blocking test using chloroform.

(18) The thermoplastic laminate film of (1) above, obtained by the steps of:

(a) applying a coating solution on an unoriented or monoaxially oriented thermoplastic film, the coating solution comprising the polyester graft copolymer (A) and the resin (B) comprising at least one member selected from the group consisting of a polyurethane resin, an acrylic resin and a vinyl resin, (b) drying the film, (c) monoaxially or biaxially orienting the film, and (d) thermosetting the film.

DETAILED DESCRIPTION OF THE INVENTION

The present invention is explained in detail in the following.

The thermoplastic laminate film of the present invention comprises a thermoplastic substrate film and a layer that improves adhesive property of the film, which is formed on the substrate film (hereinafter to be referred to as an adhesion improving layer).

(thermoplastic substrate film)

The thermoplastic substrate film to used in the present invention is exemplified by polyester film, polyolefin film (e.g., polypropylene film), polystyrene film, poly(vinyl chloride) film, polyamide film.

In the present invention, the above-mentioned thermoplastic substrate film may contain a slidability imparting agent, such as a particle lubricant and organic lubricant, to prevent blocking between films and to improve slidability. The particle lubricant is exemplified by inorganic fine particles such as silica, alumina and calcium carbonate, crosslinked acrylic particles, crosslinked polystyrene particles and the like. The organic lubricant includes higher fatty acid amides such as stearic acid amide, behenic acid amide, erucic acid amide, N-stearylstearic acid amide, ethylenebisbehenic acid amide, ethylenebisstearic acid amide and the like, aliphatic acid metal salts, fatty acid esters and the like. The particle lubricant and organic lubricant may be used alone or concurrently on demand.

The above-mentioned particle lubricant and organic lubricant are preferably contained in a proportion of 0.05–1.0 wt %, and more preferably 0.15–0.7 wt % in the thermoplastic substrate film. When the content is less than 0.05 wt %, the film may show insufficient slidability, whereas when it exceeds 1.0 wt %, the film may show poor transparency.

In the present invention, the particle lubricant and/or organic lubricant have/has an average particle size of 0.5–5.0 μm, particularly 1.0–4.0 μm. When the average particle size is less than 0.5 μm, the film may fail to show sufficient slidability, whereas when it exceeds 5.0 μm, the film may show poor transparency and poor halftone printability.

In the present invention, various additives may be added as long as the object and property of the thermoplastic laminate film are not impaired. Examples of the additive include antioxidant, light resistant, gelation preventive, pigment, antistatic agent, surfactant and the like This thermoplastic substrate film can be produced by a known production method. The thermoplastic substrate film for use can be unoriented or oriented. For an improved processing property of the film, the inventive thermoplastic laminate film is preferably used upon monoaxial or biaxial orientation. The film can be drawn by a known method, such as tenter sequential biaxial orientation, tenter simultaneous biaxial orientation, tubular method and the like.

(adhesion improving layer)

In the present invention, the adhesion improving layer is formed from a resin composition comprising a polyester graft copolymer (A) and a resin (B). The polyester graft copolymer (A) is obtained by grafting at least one polymerizable unsaturated monomer, which comprises an acid anhydride having a double bond, to a hydrophobic polyester resin, and the resin (B) comprises at least one member selected from the group consisting of a polyurethane resin, an acrylic resin and a vinyl resin. In the present invention, by "grafting" in the polyester graft copolymer (A) is meant introduction of a branched polymer (polymer made of polymerizable unsaturated monomer) distinct from the polymer main chain (hydrophobic polyester) into the polymer main chain.

hydrophobic polyester resin

In the present invention, the hydrophobic polyester resin needs to be essentially insoluble in water, which means it inherently does not dissolve or cannot be dispersed in water easily.

The dicarboxylic acid component of said hydrophobic polyester resin comprises an aromatic dicarboxylic acid in a proportion of 30–99.5 mol %, an aliphatic dicarboxylic acid and/or an alicyclic dicarboxylic acid in a proportion of 0–70 mol % and a polymerizable unsaturated double bond-containing dicarboxylic acid in a proportion of 0.5–10 mol %, particularly, an aromatic dicarboxylic acid in a proportion of 60–99.5 mol %, an aliphatic dicarboxylic acid and/or an alicyclic dicarboxylic acid in a proportion of 0–40 mol %, and a polymerizable unsaturated double bond-containing dicarboxylic acid in a proportion of 0.5–10 mol %. When the aromatic dicarboxylic acid is less than 30 mol % or when aliphatic dicarboxylic acid and/or alicyclic dicarboxylic acid exceed(s) 70 mol %, adhesion strength of the adhesion improving layer tends to be decreased.

When the polymerizable unsaturated double bond-containing dicarboxylic acid is less than 0.5 mol %, polymerizable unsaturated monomer may not be efficiently grafted to hydrophobic polyester resin, and conversely, when it exceeds 10 mol %, the viscosity increases too much in the latter half of the graft polymerization, which may unpreferably prevent uniform progress of the graft polymerization. More preferably, the aromatic dicarboxylic acid is contained in a proportion of 70–98 mol %, the aliphatic dicarboxylic acid and/or alicyclic dicarboxylic acid in a proportion of 0–30 mol %, and the polymerizable unsaturated double bond-containing dicarboxylic acid in a proportion of 2–7 mol %.

Examples of aromatic dicarboxylic acid include terephthalic acid, isophthalic acid, orthophthalic acid, naphthalenedicarboxylic acid, biphenyldicarboxylic acid and the like. The use of hydrophilic group-containing aromatic dicarboxylic acid is acceptable, by which the resultant thermoplastic laminate film has an improved transparency. The hydrophilic group-containing aromatic dicarboxylic acid is added in a proportion of not more than 5.0 mol % in the dicarboxylic acid component. When it exceeds 5.0 mol %, the resultant thermoplastic laminate film may have lower water resistance. The hydrophilic group is exemplified by carboxyl group, hydroxyl group, phosphoric acid group, phosphorous acid group, sulfonic acid group, amide group and the like.

Examples of aliphatic dicarboxylic acid include succinic acid, adipic acid, azelaic acid, sebacic acid, dodecanedicarboxylic acid, dimer acid and the like; examples of alicyclic dicarboxylic acid include 1,4-cyclohexanedicarboxylic acid, 1,3-cyclohexanedicarboxylic acid, 1,2-cyclohexanedicarboxylic acid and acid anhydride thereof.

Examples of polymerizable unsaturated double bond-containing dicarboxylic acid include α,β-unsaturated dicarboxylic acid such as fumaric acid, maleic acid, maleic anhydride, itaconic acid, citraconic acid and the like; unsaturated double bond-containing alicyclic dicarboxylic acid such as 2,5-norbornenedicarboxylic acid, tetrahydrophthalic acid, anhydrides thereof and the like. Of these, preferred in view of polymerizability are fumaric acid, maleic acid and 2,5-norbornenedicarboxylic acid.

Examples of glycol component of the hydrophobic polyester resin include at least one member from aliphatic glycol having 2 to 10 carbon atoms, alicyclic glycol having 6 to 12 carbon atoms, ether bond-containing glycol, and the like, which may be used alone or in combination. Exemplified as aliphatic glycol having 2 to 10 carbon atoms are ethylene glycol, 1,2-propylene glycol, 1,3-propanediol, 1,4-butanediol, 1,5-pentanediol, neopentyl glycol, 1,6-hexanediol, 3-methyl-1,5-pentanediol, 1,9-nonanediol, 2-ethyl-2-butylpropanediol and the like. Examples of alicyclic glycol having 6 to 12 carbon atoms include 1,4-cyclohexanedimethanol and the like.

Examples of ether bond-containing glycol include diethylene glycol, triethylene glycol, dipropylene glycol, glycols obtained by adding ethylene oxide or propylene oxide to two phenolic hydroxyl groups of bisphenols, such as 2,2-bis(4-hydroxyethoxyphenyl)propane and the like. Where necessary, polyethylene glycol, polypropylene glycol, polytetramethylene glycol and the like may be used.

A polycarboxylic acid and/or a polyol, both having three or more functional groups, may be copolymerized into the hydrophobic polyester resin in a proportion of 0–5 mol %. Examples of polycarboxylic acid having three or more functional groups include (anhydrous) trimellitic acid, (anhydrous) pyromellitic acid, (anhydrous) benzophenonetetracarboxylic acid, trimesic acid, ethylene glycol bis(anhydrous trimellitate), glycerol tris(anhydrous trimellitate) and the like. Examples of polyol having three or more functional groups include glycerol, trimethylolethane, trimethylolpropane, pentaerythritol and the like. The polycarboxylic acid and/or polyol, both having three or more functional groups, are/is contained in a proportion of 0–5 mol %, preferably 0–3 mol %, of the entire acid component or entire glycol component. When they/it exceed(s) 5 mol %, the polyester resin easily becomes a gel during polymerization.

The weight average molecular weight of the hydrophobic polyester resin is preferably 5000–50000. When the molecular weight is less than 5000, adhesive strength of the adhesion improving layer tends to become poor, whereas when it exceeds 50000, gelation during polymerization tends to occur.

Polymerizable unsaturated monomer

The polymerizable unsaturated monomer may be, for example, fumaric acid; monoesters or diesters of fumaric acid, such as monoethyl fumarate, diethyl fumarate and dibutyl fumarate; maleic acid and anhydride thereof; monoesters or diesters of maleic acid, such as monoethyl maleate, diethyl maleate and dibutyl maleate; itaconic acid and anhydrides thereof; monoesters or diesters of itaconic acid; maleimides such as phenyl maleimide; styrene; styrene derivatives such as α-methylstyrene, t-butylstyrene, chloromethylstyrene, vinyl toluene and divinyl benzene; and the like. An acrylic polymerizable monomer, which is one of the polymerizable unsaturated monomers, is, for example, alkyl (meth)acrylates wherein alkyl is exemplified by methyl, ethyl, n-propyl, isopropyl, n-butyl, isobutyl, t-butyl, 2-ethylexyl, cyclohexyl, phenyl, benzyl, phenylethyl and the like; hydroxy-containing (meth)acrylic monomers such as 2-hydroxyethyl acrylate, 2-hydroxyethyl methacrylate, 2-hydroxypropyl acrylate and 2-hydroxypropyl methacrylate; amide group-containing (meth)acrylic monomers such as acrylamide, methacrylamide, N-methylmethacrylamide, N-methylacrylamide, N-methylolacrylamide, N-methylolmethacrylamide, N,N-dimethylolacrylamide, N-methoxymethylacrylamide, N-methoxymethylmethacrylamide and N-phenylacrylamide; amino group-containing (meth)acrylic monomers such as N,N-diethylaminoethyl acrylate and N,N-diethylaminoethyl methacrylate; epoxy group-containing (meth)acrylic monomers such as glycidyl acrylate and glycidyl methacrylate; (meth)acrylic monomers having carboxyl group or a salt thereof, such as acrylic acid, methacrylic acid and salts thereof (e.g., sodium salt, potassium salt and ammonium salt; and the like. The above-mentioned polymerizable unsaturated monomers can be copolymerized by using one or two kinds thereof. In the present invention, the essential use of an acid anhydride having a double bond as a polymerizable unsaturated monomer leads to superior adhesive property of the adhesion improving layer. The acid anhydride having a double bond is preferably added in a proportion of not less than 0.1 mol %, more preferably not less than 0.5 mol % in the polymerizable unsaturated monomer. As the acid anhydride having a double bond, maleic anhydride is preferably used from among the above examples. In addition, the concurrent use of styrene and maleic anhydride is particularly preferably to prevent gelation during polymerization.

Graft polymerization

The weight ratio of hydrophobic polyester resin to polymerizable unsaturated monomer, which affords a desirable polyester graft copolymer (A) suitable for the object of the present invention, is preferably hydrophobic polyester resin/polymerizable unsaturated monomer=40/60–95/5, more preferably 55/45–93/7, and most preferably 60/40–90/10. When the weight ratio of the hydrophobic polyester resin is less than 40 wt %, the obtained polyester graft copolymer (A) may not exert superior adhesive property that polyesters originally possess. On the other hand, when the weight ratio of the hydrophobic polyester resin is greater than 95 wt %, the obtained polyester graft copolymer (A) tends to be associated with blocking which is a defect of polyesters.

The graft polymerization is generally performed by dissolving a hydrophobic polyester resin in an organic solvent, and allowing reaction of at least one kind of polymerizable unsaturated monomer by the use of a polymerization initiator with the polyester resin in the solution. The reaction product after completion of graft polymerization contains the desired polyester graft copolymer of the hydrophobic polyester resin and the polymerizable unsaturated monomer, as well as ungrafted hydrophobic polyester resin and polymer of the above-mentioned unsaturated monomers that did not graft to the hydrophobic polyester resin. The polyester graft copolymer (A) in the present invention means not only the above-mentioned polyester graft copolymer but also reaction mixture containing, in addition to said polyester graft copolymer, the ungrafted hydrophobic polyester resin and the polymer of the above-mentioned unsaturated monomers that did not undergo grafting.

As the graft polymerization initiator to be used in the present invention, organic peroxides and organic azo compounds can be used, which are known to those of ordinary skill in the art. As the organic peroxides, usable are benzoylperoxide, t-butyl peroxypivalate and the like, and as the organic azo compound, usable are 2,2'-azobisisobutyronitride, 2,2'-azobis(2,4-dimethylvaleronitrile) and the like. The amount of the polymerization initiator for graft polymerization is at least 0.2 wt %, preferably not less than 0.5 wt %, relative to the polymerizable unsaturated monomer.

IN the present invention, the polyester graft copolymer (A) has an acid value of preferably not less than 600 eq/$10^6$ g, more preferably not less than 1200 eq/$10^6$ g. When the polyester graft copolymer (A) has an acid value of less than 600 eq/$10^6$ g, the adhesion property of the adhesion improving layer tends to become insufficient.

Dispersing in water

The polyester graft copolymer (A) may be used in the form of a solution or dispersion of an organic solvent, or a solution of or dispersion in an aqueous solvent. In particular, a dispersion in an aqueous solvent, namely, the resin dispersed in water, is preferably used in view of working environment and coatability. Such resin dispersed in water can be generally obtained by graft polymerizing the polymerizable unsaturated monomer comprising a hydrophilic polymerizable unsaturated monomer to the aforementioned hydrophobic polyester resin in an organic solvent and then adding water and evaporating the organic solvent.

The hydrophilic polymerizable unsaturated monomer to be grafted to hydrophobic polyester resin has a hydrophilic group or a group capable of converting to a hydrophilic group at a later stage. Examples of the hydrophilic group include carboxyl group, hydroxyl group, phosphoric acid group, phosphorus acid group, sulfo group, amido group, quaternary ammonium salt group and the like. Examples of the group capable of converting to a hydrophilic group include carboxylic anhydride group, glycidyl group, chlorine and the like. Of these groups, carbonyl group is preferably which increases the acid value of the polyester graft copolymer (A). Thus, a polymerizable unsaturated monomer having a carboxyl group or a group capable of converting to carbonyl group is preferable. Such hydrophilic polymerizable unsaturated monomer is preferably a monomer having a carboxyl, carboxylic anhydride group, hydroxy, amino and the like, from among those exemplified as polymerizable unsaturated monomer in the above, more preferably a monomer having a carboxylic anhydride group, particularly maleic anhydride. In the coating solution, the carboxylic anhydride group of the polymerizable unsaturated monomer converts to a carboxyl group. When the coating solution is applied to a thermoplastic substrate film and dried, it returns to the carboxylic anhydride group due to dehydration.

When a polyester graft copolymer (A) is used as the water-dispersible resin, the polymer component of the polymerizable unsaturated monomer which is a branch polymer in the polyester graft copolymer (A) preferably has a weight average molecular weight of 500–50,000. Control of the weight average molecular weight of this polymer component to less than 500 is not feasible in general, so that graft efficiency tends to be low and the hydrophilic group may not be sufficiently afforded to the hydrophobic polyester resin. The polymer component of the polymerizable unsaturated monomer forms a hydrate layer of dispersed particles. For a sufficient thickness of the hydrate layer and a stable dispersion to be obtained, this polymer component preferably has a weight average molecular weight of not less than 500. The upper limit of the weight average molecular weight of the polymer component is preferably 50,000 for polymerizability by solution polymerization. The molecular weight can be controlled to fall within this range by adjusting the amount of polymerization initiator, time of dropwise addition of monomer, polymerization time, reaction solvent, monomer composition, and where necessary, combining chain transfer agent, polymerization inhibitor and the like as appropriate.

The resin dispersed in water preferably has an average particle size as determined by laser scattering method of not more than 500 nm, particularly 10–500 nm, and appeared semi-transparent or milky white. By adjusting polymerization process, the resin dispersed in water having various particle sizes can be obtained. From the aspect of dispersion stability, the resin dispersed in water preferably has an average particle size of not more than 400 nm, more preferably not more than 300 nm. When it exceeds 500 nm, film-forming performance tends to become poor to make the coated layer non-uniform. As a result, the gloss on the surface of the adhesion improving layer tends to decrease, resulting in lowered transparency. On the other hand, when it is less than 10 nm, an improvement in water resistance of the adhesion improving layer, which is one of the objects of the present invention, tends to become undesirably less.

For obtaining water-dispersible polyester graft copolymer (A), graft polymerization preferably proceeds in an aqueous organic solvent having a boiling point of 50–250° C. as a reaction solvent. As used herein, by the aqueous organic solvent is meant a solvent having a solubility in water at 20° C. of at least 10 g/L, preferably 20 g/L. A solvent having a boiling point exceeding 250° C. is slow at evaporation and cannot be removed to a satisfactory level even by a high temperature heat treatment during film forming. Conversely, graft polymerization using a solvent having a boiling point of less than 50° C. is undesirable, because it is associated with the risk in handling due to the inevitable use of an initiator that is decomposed into radicals at a temperature of less than 50° C. Examples of such aqueous organic solvent include the following aqueous organic solvents falling under the first group and the following aqueous organic solvents falling under the second group noted below.

Examples of the aqueous organic solvent belonging to group 1, that dissolves the hydrophobic polyesteer resin well and that dissolves the polymerizable unsaturated monomer, inclusive of the hydrophilic polymerizable unsaturated monomer, and the polyester graft copolymer (A) relatively well, include esters such as ethyl acetate; ketones such as methyl ethyl ketone, methyl isobutyl ketone, cyclohexanon; cyclic ethers such as tetrahydrofuran dioxane, 1, 3-dioxorane; glycol ethers such as ethylene glycol dimethyl ether, propylene glycol methylether, propylene glycol propyl ether, ethylene glycol ethyl ether, ethylene glycol butyl ether; carbitols such as methylcarbitol, ethylcarbitol, butylcarbitol; glycols or lower esters of glycol ether such as ethylene glycol diacetate, ethylene glycol ethyl ether acetate; ketone alcohols such as diacetone alcohol; N-substituted amides such as dimethylformamide, dimethylacetamide, N-methylpyrrolidone and the like.

Examples of the aqueous organic solvent belonging to group 2, that scarcely dissolves the hydrophobic polyester resin but that dissolves the polymerizable unsaturated monomer, inclusive of the hydrophilic polymerizable unsaturated monomer, and the polyester graft copolymer (A) relatively well, include water, lower alcohols, lower carboxylic acid, lower amines and the like, with particular preference given to alcohols having 1 to 4 carbon atoms and glycols.

When the graft polymerization is carried out using a single solvent, the solvent can be selected from the aqueous organic solvents belonging to group 1. When a mixed solvent is used, all the solvents to be used may be selected from those belonging to group 1, or at least one solvent is selected from those belonging to group 1 and at least one solvent is selected from those belonging to group 2. In light of the progress behavior of graft reaction, the kind of polyester graft copolymer (A) and appearance and property of aqueous dispersion derived therefrom, and the like, the mixed solvent preferably contains one from group 1 and one from group 2.

The hydrophobic polyester molecular chain in a solvent from group 1 is extended widely and, in a mixed solvent of first group/second group, it is entangled like a ball of yarn, which was confirmed by measuring the viscosity of the hydrophobic polyester resin in these solvents. It is therefore effective for prevention of gelation to control solution state of the hydrophobic polyester resin, thereby preventing easy occurrence of crosslinking between molecules. Both highly efficient graft polymerization and inhibition of gelation can be simultaneously achieved by the mixed solvent system to be mentioned later. The weight ratio of the group 1/group 2 of the mixed solvent is preferably 95/5–10/90, more preferably 90/10–20/80, particularly preferably 85/15–30/70. The optimal mixing ratio is determined depending on the solubility of the hydrophobic polyester resin to be used and the like.

In the present invention, the polyester graft copolymer (A) is preferably neutralized with a basic compound, whereby an aqueous dispersion can be obtained easily. The basic compound preferably evaporates during formation of coating layer or heat curing upon addition of a curing agent, and examples thereof include ammonium, organic amines such as triethylamine, N,N-diethylethanolamine, N,N-dimethylethanolamine, aminoethanolamine, N-methyl-N,N-diethanolamine, isopropylamine, iminobispropylamine, ethylamine, diethylamine, 3-ethoxypropylamine, 3-diethylaminopropylamine, sec-butylamine, propylamine, methylaminopropylamine, dimethylaminopropylamine, methyliminobispropylamine, 3-methoxypropylamine, monoethanolamine, diethanolamine and triethanolamine, and the like. The basic compound is used in such a manner that the pH of the aqueous dispersion falls between 5.0 and 9.0 by partial or complete neutralization according to the carboxyl group content of the polyester graft copolymer (A). The use of a basic compound having a boiling point of not more than 100° C. is associated with less residual basic compound in the coating layer after drying, and superior adhesion between the substrate film and the adhesion improving layer and between the adhesion improving layer and a layer formed thereon such as metal layer and inorganic vapor deposition layer, water resistance and resistance to hot water. The use of a basic compound having a boiling point of not less than 100° C. and residual basic compound at a level of not less than 500 ppm in the coating layer after drying can also improve transferability of a printed ink.

In the present invention, the polyester graft copolymer (A) shows self-crosslinking property. Although it is not crosslinked at a normal temperature, intramolecular reaction such as hydrogen-extracting reaction due to the action of the radical generated by heating and the like proceeds because of the heat used for drying following coating, and is crosslinked without a crosslinking agent. As a result, the adhesive property and water resistance of the inventive adhesion improving layer can be manifested. The crosslinking property of the coated layer can be evaluated by various methods. For example, it can be confirmed based on the proportion of insoluble matter in chloroform that dissolves polyester graft copolymer (A). The proportion of insoluble matter in the coating layer obtained by drying at a temperature not more than 80° C. and heat treatment at 120° C. for 5 minutes is preferably not less than 50%, more preferably not less than 70%. When it is less than 50%, adhesive property and water resistance tend to become insufficient and blocking occurs.

<resin (B)>

In the present invention, the resin composition for the adhesion improving layer comprises, besides the above-mentioned polyester graft copolymer (A), at least one resin (B) comprising at least one member selected from polyurethane resin, acrylic resin and vinyl resin. By containing resin (B), the adhesion improving layer is afforded highly refined adhesive property, water resistance and resistance to solvent. The resin (B) to be used in the present invention may be a resin capable of dissolving or dispersing in an organic solvent or water, which is determined depending on use and production method. For application and drawing in the film forming procedure, the use of an aqueous resin (i.e., capable of dissolving or being dispersed in water) is preferable.

IN the present invention, resin (B) may be a polyurethane resin, acrylic resin or vinyl resin, particularly a polyurethane resin or acrylic resin, or a copolymer made from two members selected from the group consisting of polyurethane resin, acrylic resin and vinyl resin, particularly a copolymer made from a polyurethane resin and an acrylic resin.

Polyurethane resin

Introduction of carboxyl group or a salt thereof, sulfonic acid group of a salt thereof, or sulfuric semiester group or a salt thereof into the polyurethane resin results in the polyurethane resin having a higher affinity for water. The polyhydroxy compound to be used for the synthesis of the polyurethane resin is exemplified by polyethylene glycol, polypropyrene glycol, polyethylenepolypropyrene glycol, polytetrapropyrene glycol, hexamethylene glycol, tetramethylene glycol, 1,5-pentanediol, diethylene glycol, triethylene glycol, polycaprolactone, polyhexamethylene adipate, polyhexamethylene sebacate, polytretramethylene adipate, polytetramethylene sebacate, trimethylolpropane, trimethylolethane, pentaerythritol, glycerine and the like.

Examples of the polyisocyanate compound include hexamethylenediisocyanate, diphenylmethanediisocyanate, tolylenediisocyanate, isophoronediisocyanate, adduct of tolylenediisocyanate and trimethylolethane and the like.

The polymerizable component to be used for higher affinity for water may be, for example, carboxylic acid-containing polyols such as dimethylolpropionic acid, dimethylolbutyric acid, dimethylol valeric acid and trimellitic acid bis(ethylene glycol)ester; amino group-containing carboxylic acids such as β-aminopropionic acid, γ-aminobutyric acid and p-aminobenzoic acid; hydroxy-containing carboxylic acids such as 3-hydroxypropionic acid, γ-hydroxybutyric acid, p-(2-hydroxyethyl)benzoic acid and malic acid; and compounds having amino or hydroxy, and a sulfonic acid group such as aminomethanesulfonic acid, 2-aminoethanesulfonic acid, 2-amino-5-methylbenzene-2-sulfonic acid, sodium β-hydroxyethanesulfonate, propanesultone adducts of aliphatic-di-primary amine compounds and butanesultone adducts thereof with preference given to propanesultone adducts of aliphatic di-primary amine compounds; and compounds having amino or hydroxy, and a sulfuric semiester group such as aminoethanol sulfate, aminobutanol sulfate, hydroxyethanol sulfate and α-hydroxybutanol sulate.

Alternatively, a polyurethane resin having an anionic group known from Japanese Patent Examined Publication Nos. 42-24194, 46-7720, 46-10193, 49-37839, Japanese Patent Unexamined Publication Nos. 50-123197, 53-126058, 54-138098 and the like or a similar polyurethane resin may be used. The major constituent components of polyurethane-forming component are polyisocyanate, polyol, a chain extender, a crosslinking agent and the like. A resin containing polyol having a molecular weight of 300–20000, polyisocyanate, a chain extender having a reactive hydrogen atom, a compound having a group reactive with isocyanate group and at least one anionic group is preferably. The anionic group in the polyurethane resin is preferably used as —SO$_3$H, —OSO$_2$H, —COOH or an ammonium salt, lithium salt, sodium salt, potassium salt or magnesium salt thereof.

Acrylic resin

The acrylic resin to be used in the present invention contains a monomer such as alkyl acrylate, alkyl methacrylate (wherein alkyl may be methyl, ethyl, N-propyl, isopropyl, n-butyl, isobutyl, t-butyl, 2-ethylhexyl, cyclohexyl, phenyl, benzyl, phenylethyl and the like), hydroxy-containing monomer (e.g., 2-hydroxyethyl acrylate, 2-hydroxyethyl methacrylate, 2-hydroxypropyl methacrylate and the like), amide-containing monomer (e.g., acrylamide, methacrylamide, N-methylmethacrylamide, N-methylacrylamide, N-methylolacrylamide, N-methylolmethacrylamide, N,N'-dimethylolacrylamide, N-methoxymethylacrylamide, N-methoxymethylmethacrylamide, N-phenylacrylamide and the like), amino-containing monomer (e.g., N,N'-diethylaminoethyl acrylate, N,N'-diethylaminoethyl methacrylate and the like), epoxy-containing monomers (e.g., glycidyl acrylate, glycidyl methacrylate and the like), monomer containing carboxyl group or a salt thereof (e.g., acrylic acid, methacrylic acid and salt thereof (e.g., sodium salt, potassium salt, ammonium salt) and the like) and the like. These may be used together with other kinds of monomers. Other kinds of monomers include epoxy group-containing monomers (e.g., allylglycidyl ether and the like), monomers containing sulfonic acid group or a salt thereof (e.g., styrenesulfonic acid and salt thereof (e.g., sodium salt, potassium salt, ammonium salt and the like) and the like), monomers containing carboxyl group or a salt thereof (e.g., chrotonic acid, itaconic acid, maleic acid, fumaric acid and salts thereof (e.g., sodium salt, potassium salt, ammonium salt and the like) and the like), allylisocyanate, styrene, alkyl maleic monoesters, alkyl fumaric monoesters, acrylonitrile, methacrylonitrile, alkyl itaconic monoesters, and the like. In addition, vinyl compounds are also usable.

One or more kinds of monomers from the above-mentioned monomers are subjected tyo copolymerization. For imparting hydrophilicity to acrylic resin, and for achieving dispersion stability of an aqueous solution, adhesion to a substrate film and the like, hydroxy, amide, carboxyl or a salt thereof (e.g., sodium salt, potassium salt, ammonium salt) is preferable.

Vinyl resin

The vinyl resin monomer to be used in the present invention include acrylicglycidyl ether, vinylsulfonic acid, vinylisocyanate, styrene, vinylmethylether, vinylethylether, vinyltrisalkoxysilane, acrylonitrile, vinylidene chloride, vinyl acetate, vinyl chloride and the like, which may be used alone or in combination.

Copolymerizable resin

The copolymer made from at least two members selected from polyurethane resin, acrylic resin and vinyl resin may be various graft resins. For example, it may be a comb model graft polymer wherein, for example, poly(methyl (meth) acrylate) is the main chain and poly(2-hydroxyethyl (meth) acrylate) is the side chain. An acrylic graft polyurethane wherein the main chain is polyurethane and the side chain is acrylic polymer is also an example thereof.

Besides these, block polymers can be used. For example, an aqueous acrylic polymer—polyurethane block polymer can be used. The monomer for the aqueous acrylic polymer constituting the block polymer may be those exemplified with regard to the above-mentioned acrylic resin. For imparting hydrophilicity to acrylic polymer, and for achieving dispersion stability of an aqueous solution, adhesion to a substrate film and the like, a block polymer having a functional group such as hydroxy, amide, carboxyl or a salt thereof (e.g., sodium salt, potassiums salt, ammonium salt) is preferable. The polyurethane resin to be used for the above-mentioned copolymerization resin may be those exemplified with regard to the above-mentioned polyurethane resin.

The content ratio of the polyester graft copolymer (A) and the resin (B) is determined according to use and is free of particular limitation. It is preferably 99:1–40:60, more preferably 95.5–50:50.

In the present invention, the absorbance ratio (X/Y), wherein X is a peak absorbance of the carboxylic anhydride group of the acid anhydride in the layer and Y is a peak absorbance of the ester derived from the aliphatic dicarboxylic acid, is preferably not less than 0.05, more preferably not less than 0.5. When the absorbance ratio is less than 0.5, the adhesion between the adhesion improving layer and the substrate film and between the adhesion improving layer and the layer formed thereon such as sealant layer and ink layer become insufficient.

<Additive>

In the present invention, the resin composition for the adhesion improving layer contains at least one additive selected from wax, inorganic particles and organic particles, whereby improving slidability and resistance to blocking of the adhesion improving layer.

Wax

The wax to be used in the present invention is exemplified by natural wax, synthetic wax and mixtures thereof.

The natural wax includes plant wax, animal wax, mineral wax and petroleum wax. The plant wax includes candelilla wax, carnauba wax, rice wax, Japan wax and jojova oil. The animal wax includes bee wax, lanolin and spermaceti. The mineral wax includes montanic wax, ozokerite and ceresin. The petroleum wax includes paraffin wax, microcrystalline wax and petrolatum.

The synthetic wax includes synthetic hydrocarbons, modified waxes, hydrogenated waxes, fatty acids, acid amides, amines, imides, esters and ketones. As the synthetic hydrocarbon, Fischer-Tropsch wax, polyethylene wax are commonly known. Besides these, low molecular weight polymer (having viscosity number average molecular weight of from 500 to 20000) includes polypropyrene, ethylene-acrylic acid copolymer, polyethylene glycol and block or graft compound of polyethylene glycol and polypropylene glycol.

The modified wax includes montanic wax derivatives, paraffin wax derivaties and microcrystalline wax derivatives. As used herein, by the derivative is meant purified, oxidized, esterified or saponified compound or a compound obtained by a combination of these treatments. The hydrogenated wax includes castor oil and castor oil derivatives.

The fatty acid includes 12-hydroxystearic acid, ester, metal soap and amide thereof. The acid amide is exemplified by fatty acid amides and N-substituted fatty acid amides. For example, fatty acid amide may be, but not limited to, lauric acid amide, stearic acid amide, oleic acid amide, erucic acid amide, ricinoleic acid amide and 12-hydroxystearic acid amide. Examples of N-substituted fatty acid amide include N,N'-ethylenebislauric acid amide, N,N'-ethylenebisstearic acid amide, N,N'-ethlenebisoleic acid amide, N,N'-ethylenebisbehenic acid amide, N,N'-ethylenebis-12-hydroxystearic acid amide, N,N'-butylenebisstearic acid amide, N,N'-hexylylenebisstearic acid amide, N,N'-hexamethylenebisoleic acid amide, N,N-xylylenebisstearic acid amide, N,N-stearic acid monomethylolamide, coconut oil fatty acid monoethanol amide, stearic acid diethanolamide, N-oleylstearic acid amide, N-oleyloleic acid amide, N-stearylstearic acid amide, N-stearyloleic acid amide, N-oleylpalmitic acid amide, N-stearylerucic acid amide, N,N'-dioleyladipic acid amide, N,N'-distearyladipic acid amide, N,N'-dioleylsebacic acid amide, N,N'-distearylterephthalic acid amide and N,N'-distearylisophthalic acid amide.

Examples of amine include dodecylamine, tetradecylamine, octadecylamine, oleylamine and dioctadecylamine. Examples of imide include condensation reaction product of phthalic anhydride and long chain aliphatic primary amine.

Ester may be an ester of monovalent alcohol and fatty acid, glycerine fatty acid ester, glycol fatty acid ester and sorbitan fatty acid ester. The ester of monovalent alcohol and fatty acid may be, but not limited to, methyl laurate, methyl myristate, methyl plamitate, methyl stearate, coconut oil fatty acid methyl ester, isopropyl myristate, butyl stearate, octadecyl stearate and olein oleate. Glycerine fatty acid ester may be, but not limited to, glycerine monostearate, glycerine monopalmitate, glycerine monooleate and glycerine docosanoate. Glycerine fatty acid ester also includes not only monoester but also diester, triester and mixtures thereof. The glycol fatty acid ester may be, but not limited to, a wax obtained by reacting fatty acid with ethylene glycol, propylene glycol, polyethylene glycol, polypropylene glycol and the like. Examples thereof include, but not limited to, ethylene glycol monostearate, propylene glycol monostearate, propylene glycol monopalmitate, polyoxyethylene monostearate and polypropylene glycol monostearate. Sorbitan fatty acid ester may be, but not limited to, sorbitan monostearic acid ester.

Examples of ketone include diheptadecyl ketone and diundecyl ketone.

The above-mentioned wax may be used alone or in combination. It can be concurrently used with inorganic particle or organic particle. The amount of the wax added is preferably 0.001–1 wt %, more preferably 0.005–0.5 wt % of the weight of the resin in the adhesion improving layer. When it exceeds 1 wt %, the adhesive property tend to become poor, and when it is less than 0.001 wt %, the slidability and resistance to blocking may not be improved. However, the difference in affinity between other additives and wax may affect the range where the effect indigenous to the wax is expressed.

Inorganic particle, organic particle

The inorganic particle to be used in the present invention may be silicon oxide, aluminum oxide, kaolin, zinc oxide and the like. The organic particle to be used in the present invention may be crosslinked polymer particles, whose typical examples include particle of a copolymer comprising a monovinyl compound (I) having, in a molecule, a single unsaturated aliphatic bond and, as a crosslinking agent, compound (II) having, in a molecule, two or more unsaturated aliphatic bonds. In this case, the copolymer may have a group reactive with the polyester. Examples of monovinyl compound (I) include acrylic acid, methacrylic acid and alkyl or glycidyl ester thereof, maleic anhydride and alkyl derivative thereof, vinyl glycidyl ether, vinyl acetate, styrene, alkyl substituted styrene and the like. Compound (II) is exemplifed by divinylbenzene, divinylsulfone, ethylene glycol dimethacrylate and the like. One or more from compounds (I) and (II) are respectively used, which may be copolymerized with a compound having ethylene or nitrogen atom.

In the present invention, the composition is preferably determined in such a manner that the crosslinked polymer particle is easily modified. For this end, copolymerizable components, particularly compound (I), is determined to make the crosslinked polymer have a lower glass transition temperature, which is specifically not more than 95° C., preferably not more than 85° C., and most preferably not more than 75° C. Therefore, the compound is preferably selected so that an independent polymer thereof will have a glass transition temperature of not more than 0° C. Examples of such compound include, but not limited to, $C_6$–$C_{12}$ alkyl esters of acrylic acid and styrene derivatives having $C_6$–$C_{12}$ alkyl substituent at p-position.

The degree of crosslinking of the crosslinked polymer particle has great bear on the facilitated modification. Thus, in the present invention, the degree of crosslinking is relatively lowered within the range heat resistance is achieved. To be specific, the weight ratio of the compound (II) is 0.5–20%, preferably 0.7–15%, and more preferably 1–15%.

In the present invention, the above-mentioned inorganic particle and organic particle have an average particle size of 0.01–5 μm, preferably 0.1–1.5 μm. When the average particle size is less than 0.01 μm, the film may have insufficient slidability and insufficient improvement in abrasion resistance. When it exceeds 5 μm, the film may have greater surface roughness to cause problems in appearance upon printing and the like.

The inorganic particle and/or organic particle are/is added in an amount corresponding to 0.001–10 wt %, more preferably 0.005–5 wt %, of the weight of the resin in the adhesion improving layer. When it exceeds 10 wt %, the transparency tend to become poor, and when it is less than 0.001 wt %, an improvement in slidability and resistance to blocking may be void. However, due to the difference in the affinity between other additives and inorganic particle and/or organic particle, the range where the effect indigenous to inorganic particle and/or organic particle is expressed may not be limited to the range mentioned above.

The above-mentioned inorganic particle and organic particle may be used in combination of several kinds from each or the inorganic particle and organic particle may be used concurrently or in combination with a wax.

Antistatic agent

The resin composition for the adhesion improving layer in the present invention may contain an antistatic agent. Addition of an antistatic agent affords antistatic property to the adhesion improving layer. The antistatic agent to be used in the present invention include anionic and cationic surfactants, polymer surfactant, conductive resin and fine particles such as polyaniline, polypyrrole and the like, and the like. It is free of particular limitation and can be selected from known antistatic agents and used alone or in combination. From the aspect of heat resistance, the use of a compound containing alkyl having 3 to 13 carbon atoms, aromatic residue and sodium sulfonate group is preferable. As used herein, the aromatic residue means phenyl, biphenyl, triphenyl, diphenyloxide group, naphthyl and the like. The number of sodium sulfonate group may be one or above. For example, sodium dodecylbenzenemonosulfonate, sodium dodecylbenzenesulfonate, sodium dodecyldioxidemonosulfonate, disodium dodecyldioxidedisulfonate, disodium dodecylnaphthalenedisulfonate and the like can be used. The antistatic agent content is preferably antistatic agent/resin=0.1/0.9–0.9/0.1, particularly 0.2/0.8–0.8/0.2, in weight ratio relative to the resin in the adhesion improving layer. When the content is less than the range mentioned above, antistatic effect does not appear. Conversely, when it exceeds the above-mentioned range, the antistatic effect become saturated and when the film of the present invention is layered, the antistatic agent is transferred to the side of the substrate film where the adhesion improving layer is not formed and adversely affects the printability and property of the laminate.

The antistatic agent can be added to the resin composition for the adhesion improving layer by any means. For example, an aqueous solution or aqueous dispersion of the antistatic agent and an aqueous dispersion of the resin composition are directly mixed. The coating solution of the resin composition comprising the antistatic agent has a solid concentration of generally about 1–50 wt %, preferably 3–30 wt %, but is not limited to this range.

Crosslinking agent

In the present invention, moreover, the resin composition for the adhesion improving layer can contain a crosslinking agent, whereby the adhesion improving layer has high adhesive property, high water resistance and high resistance to solvent. The crosslinking agent is free of particular limitation as long as it is capable of crosslinking reaction with the functional group present in the aforementioned polyester graft copolymer (A) and resin (B) by the application of heat and light to finally form a three dimensional net structure.

Examples of the crosslinking agent include phenol-formaldehyde resin comprising a condensate of alkylated phenols or cresols and formaldehyde; amino resins such as an adduct of formaldehyde with urea, melamine, benzoguanamine and the like, and alkyl ether compound consisting of said adduct and an alcohol having 1 to 6 carbon atoms; multifunctional epoxy compounds; multifunctional isocyanate compounds; block isocyanate compounds; multifunctional aziridine compounds; oxazoline compounds and the like.

The phenol-formaldehyde resin may be, for example, a condensate of formaldehyde and a phenol such as alkylated (methyl, ethyl, propyl, isopropyl or butyl)phenol, p-tert-amylphenol, 4,4'-sec-butylidenephenol, p-tert-butylphenol, o-, m-, p-cresol, p-cyclohexylphenol, 4,4'-isopropylidenephenol, p-nonylphenol, p-octylphenol, 3-pentadecylphenol, phenol, phenyl-o-cresol, p-phenylphenol and xylenol.

Examples of amino resin include, for example, methoxylated methylolurea, methoxylated methylol N,N-ethyleneurea, methoxylated methyloldicyandiamide, methoxylated methylolmelamine, methoxylated methylolbenzoguanamine, butoxylated methylolmelamine, butoxylated methylolbenzoguanamine and the like, with preference given to methoxylated methylolmelamine, butoxylated methylolmelamine and methylolbenzoguanamine.

Examples of multifunctional epoxy compound include diglycidyl ether of bisphenol A and oligomer thereof, diglycidyl ether of hydrogenated bisphenol A and oligomer thereof, diglycidyl orthophthalate, diglycidyl isophthalate, diglycidyl terephthalate, diglycidyl p-hydroxybenzoate, diglycidyl tetrahydrophthalate, diglycidyl hexahydrophthalate, diglycidyl succinate, diglycidyl adipate, diglycidyl sebacate, ethylene glycol diglycidyl ether, propylene glycol diglycidyl ether, 1,4-butanediol diglycidyl ether, 1,6-hexanediol diglycidyl ether, polyalkylene glycol diglycidyl ethers, triglycidyl trimellitate, triglycidyl isocyanurate, 1,4-diglycidyloxybenzene, diglycidylpropylene urea, glycerol triglycidyl ether, trimethylolpropane triglycidyl ether, pentaerythritol triglycidyl ether, glycerolalkylene oxide adducts of triglycidyl ether and the like.

As the multifunctional isocyanate compound, low or high molecular aromatic or aliphatic diisocyanate, polyisocyanate having 3 or more functional groups and the like can be used. Examples of polyisocyanate include tetramethylene diisocyanate, hexamethylene diisocyanate, toluene diisocyanate, diphenylmethane diisocyanate, hydrogenated diphenylmethane diisocyanate, xylylene diisocyanate, hydrogenated xylylene diisocyanate, isophorone diisocyanate and trimers of these isocyanate compounds. Moreover, compounds having terminal isocyanate may be used, which are obtained by reacting an excess isocyanate compound and a low molecular active hydrogen-containing compound such as ethylene glycol, propylene glycol, trimethylolpropane, glycerol, sorbitol, ethylenediamine, monoethanolamine, diethanolamine and triethanolamine, or a high molecular active hydrogen-containing compound such as polyester polyols, polyether polyols and polyamides.

The block isocyanate can be obtained by addition reaction of the above-mentioned isocyanate compound and a blocking agent by an appropriate method conventionally known. Examples of the agent for blocking isocyanate include phenols such as phenol, cresol, xylenol, resorcinol, nitrophenol, chlorophenol and the like; thiophenols such as thiophenol, methylthiophenol and the like; oximes such as acetoxime, methyl ethyl ketoxime, cyclohexanoneoxime and the like; alcohols such as methanol, ethanol, propanol, butanol and the like; halogen-substituted alcohols such as ethylenechlorohydrin, 1,3-dichloro-2-propanol and the like; tertiary alcohols such as t-butanol, t-pentanol and the like; lactams such as ε-caprolactam, δ-valerolactam, ν-butyrolactam, β-propyllactam and the like; aromatic amines; imides; active methylene-containing compounds such as acetylacetone, acetoacetate, ethyl malonate and the like; mercaptans; imines; ureas; diaryl compounds; sodium bisulfite; and the like.

The crosslinking agent is added by the following methods. (1) When the crosslinking agent is water soluble, it is directly dissolved or dispersed in an aqueous solvent containing the polyester graft copolymer (A) and the resin (B). (2) When the crosslinking agent is soluble in oil, it is added to a reaction mixture after graft polymerization of the polyester graft copolymer (A). These methods can be selected as appropriate according to the kind and properties of the crosslinking agent. A curing agent and a promoting agent may be added along with the crosslinking agent.

These crosslinking agents may be used alone or in combination.

The amount of crosslinking agent is preferably 1–40 parts by weight per 100 parts by weight of the total of polyester graft copolymer (A) and resin (B).

To maintain the effect of the present invention and also to impart other functions, the resin composition for the adhesion improving layer can further contain a conductive resin such as polyaniline, polypyrrole and the like, antibacterial agent, ultraviolet absorber, photooxidation catalyst and a gas barrier resin.

The adhesion improving layer can be formed by applying a coating solution containing a resin composition for the adhesion improving layer is applied on a thermoplastic film which is a substrate film, drying the film and heating where necessary. The coating solution may be a solution or dispersion in an organic solvent or an aqueous solvent. For the absence of use of an organic solvent that causes environmental problems, an aqueous solution or dispersion is particularly preferable. The solid content of the resin composition in the coating solution is generally 1–50 wt %, preferably 3–30 wt %.

There is no particular limitation on the drying conditions of the aforementioned coating solution, but for self-crosslinking property of the aforementioned polyester graft copolymer (A) to be expressed, the calories are preferably increased as long as the substrate film and the aforementioned polyester graft copolymer (A) are free from thermal degradation. To be specific, the temperature is set to 80° C.–250° C., more preferably 150° C.–220° C., which range is not limitative, since longer drying hours can bring about sufficient self-crosslinking property even at a relatively lower temperature.

The adhesion improving layer is formed by applying the aforementioned coating solution to a thermoplastic film substrate according to a known coating method such as gravure method, reverse method, die method, bar method, dip method and the like.

The coating solution is applied in an amount in a solid content of 0.005–5 g/m², preferably 0.02–0.5 g/m². When the amount is less than 0.005 g/m², sufficient adhesion strength between the substrate film and the adhesion improving layer and between the adhesion improving layer and a layer formed thereon may not be achieved. When it is more than 5 g/m², blocking may occur, causing a practical problem.

The adhesion improving layer is formed by applying the above-mentioned coating solution to a biaxially oriented thermoplastic base film, or by applying the above-mentioned coating solution to an unoriented or monoaxially oriented thermoplastic base film, drying the film and, where necessary, subjecting monoaxial or biaxial orientation and thermosetting.

When the process involves applying the above-mentioned coating solution to an unoriented or monoaxially oriented thermoplastic film substrate, drying the film and drawing, the temperature for drying needs to be within the range that does not affect the subsequent drawing. In the case of a polyamide film substrate, the water content is set to not more than 2% and thermosetting is applied at 200° C. or above, whereby the coating layer becomes stiff, which contributes to dramatic improvement in adhesion between the adhesion improving layer and the polyamide film substrate. When the water content is more than 2%, crystallization easily occurs, though subject to variation depending on the temperature for drying, and planarity and drawability may be impaired.

The adhesion improving layer of the inventive thermoplastic laminate film shows superior adhesive property with various materials. For enhanced adhesive property and superior printability, the adhesion improving layer may undergoes surface treatment by corona treatment, flame treatment, electron beam treatment and the like.

The adhesion improving layer of the inventive thermoplastic laminate film shows superior adhesion strength in a broad range of applications. Specifically, it is evident in an ink layer of printing ink, UV ink and the like; an adhesive layer for dry laminate and extrusion laminating; a thin film layer obtained by vacuum vapor deposition, electron beam vapor deposition, sputtering, ionic plating, CVD and plasma polymerization of metal or inorganic substance or oxides thereof; an oxygen moisture absorbent layer; an organic barrier layer; an ink jet image receiving layer and the like.

The present invention is described in more detail by way of Examples, which should not be construed as limiting the invention. In the Examples, "part" means "part by weight" and "%" means "wt %." Each of the following items was determined by the methods given below.

1) Evaluation of adhesive property

On the adhesion improving layer of the thermoplastic laminate films obtained in Examples and Comparative Examples (on the polyester film in Comparative Example 5 and on the corona-treated surface in Comparative Example 8) was printed with a gravure ink (Lamiace 61 type of two component, manufactured by Toyo Ink Manufacturing Co., Ltd.) to form a printed ink layer. Then, adhesive AD585/CAT-10 (manufactured by Toyo-Mowton Co., Ltd.) was applied at 2 g/m² and a 60 μm thick unoriented polypropylene film (manufactured by Toyo Boseki Kabushiki Kaisha, P1120) was laminated according to a conventional method by dry laminating as a sealant layer to give a laminate. Peeling strength was measured after normal preservation (dry state and wet state) and in hot water at 90° C. at a tensil rate of 100 mm/min by 90° peeling. When the adhesion strength was 1,000 g/15 mm or above, the adhesive property was evaluated as fine.

2) Appearance of vapor deposition layer

A gas barrier layer was formed on the adhesion improving layer of the thermoplastic laminate films obtained in Examples and Comparative Examples (on the polyester film in Comparative Example 5 and on the corona-treated surface in Comparative Example 8) in the following manner.

Using, as a vapor deposition source, about 3–5 mm size particles of $Al_2O_3$ (purity 99.5%) and $SiO_2$ (purity 99.9%), a thin film layer of aluminum oxide/silicon oxide was formed by electron beam vapor deposition method on the adhesion improving layer of the above-mentioned thermoplastic laminate films (on the polyester film in Comparative Example 5 and on the corona-treated surface in Comparative Example 8). The vapor deposition materials were not mixed but the inside of the hearth was divided into two with a carbon board and $Al_2O_3$ and $SiO_2$ were respectively heated separately with an electron beam gun (hereinafter EB gun) as the heating source. The emission current to the EB gun was set to 2 A and the heating ratio of $Al_2O_3$:$SiO_2$ was adjusted to 35:10. The composition weight ratio of $Al_2O_3$:$SiO_2$ was 40:60, film running rate was 50 m/min, and vapor pressure was $8.5 \times 10^{-4}$ Torr to give a 800 Å thick film. The appearance of the vapor deposition surface was macroscopically observed. The evaluation is directed to the wettability of the adhesion improving layer. In Table 1, "wavy pattern" does not mean difficulty in practice with regard to the wettability of the adhesion improving layer.

3) Measurement of static friction coefficient of the film

The thermoplastic laminate films obtained in Examples and Comparative Examples were determined for the static friction coefficient (between the polyester films in Comparative Example 5, between the corona-treated surfaces in Comparative Example 8 and between the adhesion improving layers in other Examples) under RH 65% according to ASTM-D-1894. When the static friction coefficient was 0.5 or below, the slidability was evaluated as fine.

4) Evaluation of antistatic property (Measurement of surface resistance value)

According to JIS K-6911 and using R8340 type surface resistance tester (manufactured by ADVANTEST CORPORATION), the surface resistance value of the adhesion improving layer surface of the thermoplastic laminate films obtained in Examples and Comparative Examples (of the polyester film surface in Comparative Example 5 and of the corona-treated surface in Comparative Example 8) was measured at 23° C., humidity of 50%. When the surface resistance was $10^{13}$ Ω/□ or below, the antistatic property was evaluated as fine 5) Evaluation of acid anhydride amount Using FT-IR FTS.15/80 BIO-LAD. DIGILAB DIVISION GC/C32, ATR method (Ge 45°) was applied. The amount of acid anhydride was evaluated by determining the absorbance ratio (X/Y) wherein X is 1778 $cm^{-1}$ (characteristic of carboxylic anhydride group of the acid anhydride) and Y is 1177 $cm^{-1}$ (characteristic of ester group derived from aliphatic dicarboxylic acid) from differential spectrum of the film having an adhesion improving layer and the film before laminating an adhesion improving layer.

6) Adhesive blocking test using chloroform

Chloroform was dropped by 2 cc on the adhesion improving layer of the 10 cm×10 cm thermoplastic laminate film obtained in Examples and Comparative Examples (on the polyester film in Comparative Example 5 and on the corona-treated surface in Comparative Example 8), and sandwiched with the adhesion improving layer of a different but same thermoplastic laminate film, which was left standing at 25° C. for 2 hours under pressure of 10 g/$cm^2$. Then, these films were peeled off and the remaining state was observed.

7) Post-processing durability test

Using a wire bar (wire diameter 10 mil), a solvent of methyl ethyl ketone/toluene (=1/1; weight ratio) was applied on the adhesion improving layer of the thermoplastic laminate films obtained in Examples and Comparative Examples (on the polyester film in Comparative Example 5 and on the corona-treated surface in Comparative Example 8) and, after drying, flaws on the adhesion improving layer was macroscopically observed.

8) Haze

The thermoplastic laminate films obtained in Examples and Comparative Examples were tested according to JIS K-6714 using a haze tester manufactured by Toyo-Seiki Co., Ltd. When the value was 5% or below with the substrate film containing particles and 0.5% or below with the substrate film not containing particles, the haze was evaluated as fine.

Preparation of hydrophobic polyester resin hydrophobic polyester resin (resin a)

In a stainless steel autoclave equipped with a stirrer, a thermometer and a partial refluxing condenser were charged dimethyl terephthalate (345 parts), 1,4-butanediol (211 parts), ethylene glycol (270 parts) and tetra-n-butyl titanate (0.5 part), and ester exchange reaction was conducted from 160° C. to 220° C. over 4 hr. Then, fumaric acid (14 parts) and sebacic acid (160 parts) were added, and the mixture was heated from 200° C. to 220° C. over 1 hr for esterification. Then, the mixture was further heated to 255° C. and the reaction system was gradually depressurized. The reaction proceeded for 1.5 hr under depressurization at 0.22 mmHg to give hydrophobic polyester resin (resin a). The obtained polyester having weight average molecular weight of 20,000 was pale-yellow and transparent.

Hydrophilic group-containing hydrophobic polyester (resin b)

In a stainless steel autoclave equipped with a stirrer, a thermometer and partial condenser were charged dimethyl terephthalate (324 parts), sodium 3,5-dicarbomethoxybenzenesulfonate (32 parts), 1,4-butanediol (211 parts), ethylene glycol (270 parts) and tetra-n-butyl titanate (0.5 part), and ester exchange reaction was performed for 4 hr from 160° C. to 220° C. Then, fumaric acid (14 parts) and sebacic acid (160 parts) were added and the mixture was heated from 200° C. to 220° C. over 1 hr for esterification. The mixture was further heated to 255° C., the reaction system was gradually depressurized and reacted under reduced pressure of 0.22 mmHg for 1 hr to give a hydrophilic group-containing hydrophobic polyester. The obtained polyester had an average molecular weight of 8,000 and was pale-yellow and transparent (resin b).

Preparation of polyester graft copolymer (A) (resin c)

In a reactor equipped with a stirrer, a thermometer, a refluxing device and a quantitative dripping device were charged the hydrophobic polyester resin (resin a) (75 parts), methyl ethyl ketone (56 parts) and isopropyl alcohol (19 parts), and the mixture was heated and stirred at 65° C. to dissolve the resin. After complete dissolution of the resin, maleic anhydride (15 parts) was added to the polyester solution. Then, styrene (10 parts) and azobisdimethylvaleronitrile (1.5 parts) were dissolved in 12 parts of methyl ethyl ketone, which solution was added dropwise at 0.1 ml/min to the polyester solution, followed by stirring for 2 hr. A sample for analysis was taken from the reaction mixture, and methanol (5 parts) was added. Water (300 parts) and triethylamine (15 parts) were added to the reaction mixture, which was followed by stirring for 1 hr. The inner temperature of the reactor was raised to 100° C. and methyl ethyl ketone, isopropyl alcohol and excess triethylamine were removed by distillation to give polyester graft copolymer (resin c) dispersed in water. The aqueous graft copolymer (resin c) dispersion was pale-yellow and transparent, and the copolymer therein had a glass transition temperature of −10° C.

EXAMPLE 1

Terephthalic acid/isophthalic acid/5-sulfoisophthalic acid/ethylene glycol/1,4-butanediol were copolymerized at 25/20/5/25/25 (weight ratio) to give an aqueous polyester resin and the resulting resin was further reacted with neopentyl glycol (2 parts by weight) and isophoronediisocyanate (12 parts by weight) to give a polyurethane resin. Acrylic acid and ethyl acrylate were grafted to this polyurethane resin as a main chain at 10 parts by weight each relative to 100 parts by weight of the aqueous polyester resin to give an acrylic graft polyurethane resin. The water dispersible graft resin (resin c) and the acrylic graft polyurethane resin were mixed at a weight ratio of resin c:acrylic graft polyurethane resin=90:10 to give a water dispersible resin complex (resin d). The complex (resin d) was diluted with water:isopropyl alcohol=9:1 (weight ratio) such that the solid concentration was 10 wt % to give a coating solution.

Polyethylene terephthalate containing amorphous silica having an average particle size of 1.0 $\mu$m was melt-extruded at 280° C., cooled on cooling roller at 15° C. to give a 1000 $\mu$m thick unoriented film. This unoriented film was drawn 3.5 times in the longitudinal direction between a pair of rolls having different rolling speeds, at 85° C. Then, the above-mentioned coating solution was applied to the monoaxially oriented film by a roll coater method, dried with hot air at 70° C., transversely drawn 3.5 times on a tenter at 98° C. and thermoset at 200–210° C. to give a biaxially oriented polyester laminate film having a 12 $\mu$m thick. The final coating amount (solid) of the above-mentioned coating solution was 0.08 g/m$^2$.

EXAMPLE 2

The water dispersible resin complex (resin d) obtained in Example 1 was diluted with water:isopropyl alcohol=9:1 (weight ratio) such that the solid concentration was 10 wt % and an aqueous dispersion of polyethylene wax (manufactured by Chukyo-Yushi Co., Ltd. Poriron393) was added in a proportion of 0.2 wt % of the resin d to give a coating solution. Using this coating solution and in the same manner as in Example 1, a biaxially oriented polyester laminate film was obtained.

EXAMPLE 3

The water dispersible resin complex (resin d) obtained in Example 1 was mixed with disodium dodecyldiphenyloxidedisulfonate as an antistatic agent at a weight ratio of 6/4, and diluted with water:isopropyl alcohol=9:1 (weight ratio) such that the solid concentration was 10 wt % to give a coating solution. Using this coating solution and in the same manner as in Example 1, a biaxially oriented polyester laminate film was obtained.

EXAMPLE 4

The water dispersible resin complex (resin d) obtained in Example 1 was diluted with water:isopropyl alcohol=9:1 (weight ratio) such that the solid concentration was 10 wt % and fluorine surfactant (manufactured by DAINIPPON INK AND CHEMICALS, INC., Megafac F177) was added in a proportion of 1 wt % of the resin d to give a coating solution. Using this coating solution and in the same manner as in Example 1, a biaxially oriented polyester laminate film was obtained.

EXAMPLE 5

The water dispersible resin complex (resin d) obtained in Example 1 was mixed with oxazoline group-containing water soluble polymer (manufactured by NIPPON SHOKUBAI CO., LTD., Epokurosu WS-500) as a crosslinking agent at a weight ratio of resin d:water soluble polymer=95:5, and diluted with water:isopropyl alcohol=9:1 (weight ratio) such that the solid concentration was 10 wt % to give a coating solution. Using this coating solution and in the same manner as in Example 1, a biaxially oriented polyester laminate film was obtained.

EXAMPLE 6

The water dispersible resin complex (resin d) obtained in Example 1 was diluted with water:isopropyl alcohol=9:1 (weight ratio) such that the solid concentration was 10 wt % and inorganic particles of amorphous silica having an average particle size of 1.0 $\mu$m were added in a proportion of 0.25 wt % of the resin d to give a coating solution. Using this coating solution and in the same manner as in Example 1, a biaxially oriented polyester laminate film was obtained.

EXAMPLE 7

Polyethylene terephthalate without particles was melt extruded at 280° C. and cooled on a cooling roll at 15° C. to give a 100 $\mu$m thick unoriented film. This unoriented film was drawn 3.5 times in the longitudinal direction at 85° C. using a pair of rolls having different rolling speeds. Then, the water dispersible resin complex (resin d) obtained in Example 1 was diluted with water:isopropyl alcohol=9:1 (weight ratio) such that the solid concentration was 10 wt % and spherical silica having an average particle size of 0.5 $\mu$m were added in a proportion of 8 wt % of the resin d to give a coating solution. This coating solution was applied by a roll coater method, dried with hot air at 70° C., transversely drawn 3.5 times at 98° C. using a tenter, and thermoset at 200° C.–210° C. to give a biaxially oriented polyester laminate film having a thickness of 12 $\mu$m. The final amount of coating agent applied was 0.08 g/m$^2$.

EXAMPLE 8

In a reactor equipped with a stirrer, a thermometer, a refluxing device and a quantitative dripping device were charged a hydrophilic group-containing hydrophobic polyester resin containing a (resin b) (80 parts), methyl ethyl ketone (60 parts) and isopropyl alcohol (20 parts), and the mixture was heated and stirred at 65° C. to dissolve the resin. After complete dissolution of the resin, maleic anhydride (12 parts) was added to the polyester solution. Then, styrene (8 parts) and azobisdimethylvaleronitrile (1.2 parts) were dissolved in 10 parts of methyl ethyl ketone, which solution was added dropwise at 0.1 ml/min to the polyester solution, followed by stirring for 2 hr. A sample for analysis was taken from the reaction mixture, and methanol (5 parts) was added. Water (300 parts) and triethylamine (12 parts) were added to the reaction mixture, which was followed by stirring for 1 hr. The inner temperature of the reactor was raised to 100° C. and methyl ethyl ketone, isopropyl alcohol and excess triethylamine were removed by distillation to give a polyester graft copolymer (resin e) dispersed in water. The aqueous graft copolymer dispersion was pale-yellow and transparent. Using the resin e instead of the resin c in Example 1, a water dispersible resin complex was obtained. Using this resin complex instead of the resin d in Example 7, a coating solution was prepared. Following the steps of Example 7 except the above, a biaxially oriented polyester laminate film was obtained.

EXAMPLE 9

Nylon 6 resin containing amorphous silica having an average particle size of 2.0 $\mu$m in 3000 ppm was melt extruded at 280° C. and cooled on a cooling roll at 15° C. to give a 185 µm thick unoriented film. This unoriented film was drawn 3.5 times in the longitudinal direction at 85° C. using a pair of rolls having different rolling speeds. Then, the coating solution obtained in Example 1 was applied by a roll coater method, dried with hot air at 70° C., transversely drawn 3.5 times at 100° C. at a tenter temperature of 100° C., and thermoset at 200° C.–220° C. to give a biaxially oriented polyamide laminate film having a thickness of 15 µm. The final amount of coating agent applied was 0.07 g/m².

EXAMPLE 10

In the same manner as in Example 9 except the use of the coating solution obtained in Example 4 instead of the coating solution obtained in Example 1, a biaxially oriented polyamide laminate film was obtained.

COMPARATIVE EXAMPLE 1

In the same manner as in Example 1 except the use of the resin c instead of the resin d to give a coating solution, a biaxially oriented polyester laminate film was obtained.

COMPARATIVE EXAMPLE 2

In a reactor equipped with a stirrer, a thermometer, a refluxing device and a quantitative dripping device were charged hydrophobic polyester resin (resin a) (75 parts), methyl ethyl ketone (56 parts) and isopropyl alcohol (19 parts), and the mixture was heated and stirred at 65° C. to dissolve the resin. After complete dissolution of the resin, a mixture of methacrylic acid (17.5 parts) and ethyl acrylate (7.5 parts) and azobisdimethylvaleronitrile (1.2 parts) were dissolved in 25 parts of methyl ethyl ketone, which solution was added dropwise at 0.2 ml/min to the polyester solution, followed by stirring for 2 hr. A sample for analysis was taken from the reaction mixture. Water (300 parts) and triethylamine (25 parts) were added to the reaction mixture, which was followed by stirring for 1 hr. The inner temperature of the reactor was raised to 100° C. and methyl ethyl ketone, isopropyl alcohol and excess triethylamine were removed by distillation to give aqueous polyester graft copolymer (resin f) dispersion. The aqueous polyester graft copolymer (resin f) dispersion was pale-yellow, and transparent and the copolymer therein had a glass transition temperature of −20° C.

In the same manner as in Example 1 except the use of the resin f instead of the resin d to give a coating solution, a biaxially oriented polyester laminate film was obtained.

COMPARATIVE EXAMPLE 3

In the same manner as in Example 7 except the use of the resin c instead of the resin d to give a coating solution, a biaxially oriented polyester laminate film was obtained.

COMPARATIVE EXAMPLE 4

In the same manner as in Example 7 except the use of the resin f instead of the resin d to give a coating solution, a biaxially oriented polyester laminate film was obtained.

COMPARATIVE EXAMPLE 5

A 12 µm thick biaxially oriented polyester film (manufactured by Toyo Boseki Kabushiki Kaisha, ester film E5000) without a coating layer was used.

COMPARATIVE EXAMPLE 6

In the same manner as in Example 9 except the use of the resin c instead of the resin d to give a coating solution, a biaxially oriented polyamide laminate film was obtained.

COMPARATIVE EXAMPLE 7

In the same manner as in Example 9 except the use of the resin f instead of the resin d to give a coating solution, a biaxially oriented polyamide laminate film was obtained.

COMPARATIVE EXAMPLE 8

A 15 µm thick biaxially oriented polyamide film (manufactured by Toyo Boseki Kabushiki Kaisha, HARDEN film N1100) without a coating layer, and corona-treated on one side was used.

The biaxially oriented films obtained in Examples and Comparative Examples were evaluated. The results are shown in Table 1.

TABLE 1

| | peeling strength (g/15 mm) normal state | | in hot water | static friction | surface resistance | | | post-processing durability | vapor deposition surface appearance | acid anhydride content (absorbance ratio) |
|---|---|---|---|---|---|---|---|---|---|---|
| | dry state | wet state | at 90° C. | coefficient | haze (%) | value ($\Omega/\square$) | blocking test | | | |
| Ex. 1 | 1200 | 1100 | 710 | 0.51 | 4.1 | $<10^{13}$ | no adhesion | no flaw, fine exterior | wavy pattern | 0.91 |
| Ex. 2 | 1190 | 1050 | 700 | 0.44 | 4.1 | $<10^{13}$ | no adhesion | no flaw, fine exterior | wavy pattern | 0.89 |
| Ex. 3 | 1200 | 1090 | 690 | 0.49 | 4.2 | $3.2 \times 10^{11}$ | no adhesion | no flaw, fine exterior | wavy pattern | 0.86 |
| Ex. 4 | 1180 | 950 | 710 | 0.49 | 4.0 | $<10^{13}$ | no adhesion | no flaw, fine exterior | fine | 0.85 |
| Ex. 5 | 1240 | 1120 | 740 | 0.50 | 4.1 | $<10^{13}$ | no adhesion | no flaw, fine exterior | wavy pattern | 0.92 |
| Ex. 6 | 1110 | 860 | 730 | 0.35 | 5.9 | $<10^{13}$ | no adhesion | no flaw, fine exterior | wavy pattern | 0.87 |
| Ex. 7 | 1080 | 850 | 690 | 0.48 | 0.7 | $<10^{13}$ | no adhesion | no flaw, fine exterior | wavy pattern | 0.88 |
| Ex. 8 | 1070 | 820 | 630 | 0.47 | 0.5 | $<10^{13}$ | no adhesion | no flaw, fine exterior | wavy pattern | 0.84 |
| Ex. 9 | 1240 | 1070 | 650 | 0.82 | 5.5 | $<10^{13}$ | no adhesion | no flaw, fine exterior | wavy pattern | 0.82 |
| Ex. 10 | 1210 | 980 | 640 | 0.78 | 5.1 | $<10^{13}$ | no adhesion | no flaw, fine exterior | fine | 0.87 |

TABLE 1-continued

|  | peeling strength (g/15 mm) normal state | | in hot water | static friction | | surface resistance | | | post-processing durability | vapor deposition surface appearance | acid anhydride content |
|  | dry state | wet state | at 90° C. | coef-ficient | haze (%) | value ($\Omega/\square$) | blocking test | | | | (absorbance ratio) |
| --- | --- | --- | --- | --- | --- | --- | --- | --- | --- | --- | --- |
| Com. Ex. 1 | 1170 | 970 | 500 | 0.52 | 4.0 | $<10^{13}$ | no adhesion | | no flaw, fine exterior | wavy pattern | 0.86 |
| Com. Ex. 2 | 920 | 700 | 400 | 0.54 | 4.6 | $<10^{13}$ | rather adhering but film releasable | | some flaws | wavy pattern | 0.00 |
| Com. Ex. 3 | 1030 | 780 | 460 | 0.50 | 0.7 | $<10^{13}$ | no adhesion | | no flaw, fine exterior | wavy pattern | 0.87 |
| Com. Ex. 4 | 880 | 650 | 370 | 0.51 | 0.9 | $<10^{13}$ | rather adhering but film releasable | | some flaws | wavy pattern | 0.00 |
| Com. Ex. 5 | 200 | 80 | 60 | 0.90 | 3.0 | $<10^{13}$ | film unreleasable due to adhesion | | flaw in entirety | wavy pattern | 0.00 |
| Com. Ex. 6 | 1210 | 1000 | 460 | 0.80 | 5.4 | $<10^{13}$ | no adhesion | | some flaws | wavy pattern | 0.83 |
| Com. Ex. 7 | 750 | 480 | 250 | 0.83 | 5.2 | $<10^{13}$ | rather adhering but film releasable | | some flaws | wavy pattern | 0.00 |
| Com. Ex. 8 | 220 | 80 | 70 | 1.20 | 3.7 | $<10^{13}$ | film unreleasable due to adhesion | | flaw in entirety | wavy pattern | 0.00 |

This application is based on application Nos. 10-143248, 10-149869, 10-152954, 10-170795 and 10-182658 filed in Japan, the contents of which are incorporated hereinto by reference.

What is claimed is:

1. A thermoplastic laminate film comprising a thermoplastic substrate film and a layer formed from a resin composition comprising a polyester graft copolymer (A) and a resin (B), the layer being formed on at least one side of the thermoplastic substrate film, wherein the polyester graft copolymer (A) is obtained by grafting at least one polymerizable unsaturated monomer comprising an acid anhydride having a double bond to an unsaturated hydrophobic polyester resin, and the resin (B) is selected from the group consisting of polyurethane resin, an acrylic resin, a vinyl resin, and copolymers thereof, wherein said vinyl resin is a resin formed by a monomer selected from the group consisting of acrylicglycidyl ether, vinylsulfonic acid, vinylisocyanate, styrene, vinylmethylether, vinylethylether, vinyltrisalkoxysilane, acrylonitrile, vinylidene chloride, vinyl acetate, vinyl chloride and a combination thereof.

2. The thermoplastic laminate film of claim 1, wherein the resin (B) is a polyurethane resin, an acrylic resin or a vinyl resin.

3. The thermoplastic laminate film of claim 1, wherein the resin (B) is a polyurethane resin or an acrylic resin.

4. The thermoplastic laminate film of claim 1, wherein the resin (B) is a copolymer comprising at least two members selected from the group consisting of a polyurethane resin, an acrylic resin and a vinyl resin.

5. The thermoplastic laminate film of claim 1, wherein the resin (B) is a copolymer comprising a polyurethane resin and an acrylic resin.

6. The thermoplastic laminate film of claim 1, wherein the acid anhydride having a double bond is maleic anhydride.

7. The thermoplastic laminate film of claim 1, wherein the polymerizable unsaturated monomer comprises a mixture of maleic anhydride and styrene.

8. The thermoplastic laminate film of claim 1, wherein the resin composition further comprises at least one member selected from the group consisting of a wax, an organic particle and an inorganic particle.

9. The thermoplastic laminate film of claim 1, wherein the resin composition further comprises a static preventive.

10. The thermoplastic laminate film of claim 1, wherein the resin composition further comprises a surfactant.

11. The thermoplastic laminate film of claim 1, wherein the resin composition further comprises a crosslinking binder.

12. The thermoplastic laminate film of claim 1, wherein the hydrophobic polyester resin in the polyester graft copolymer (A) comprises an aromatic dicarboxylic acid in 30–99.5 mol %, an aliphatic dicarboxylic acid and/or an alicyclic dicarboxylic acid in 0–70 mol % and a polymerizable unsaturated double bond-containing dicarboxylic acid in 0.5–10 mol %, as a dicarboxylic acid component.

13. The thermoplastic laminate film of claim 1, wherein the hydrophobic polyester resin in the polyester graft copolymer (A) comprises an aromatic dicarboxylic acid in 60–99.5 mol %, an aliphatic dicarboxylic acid and/or an alicyclic dicarboxylic acid in 0–40 mol % and a polymerizable unsaturated double bond-containing dicarboxylic acid in 0.5–10 mol %, as a dicarboxylic acid component.

14. The thermoplastic laminate film of claim 1, wherein the hydrophobic polyester resin in the polyester graft copolymer (A) comprises a hydrophilic group.

15. The thermoplastic laminate film of claim 1, wherein the hydrophobic polyester resin in the polyester graft copolymer (A) comprises at least aliphatic dicarboxylic acid as a polymerizable component.

16. The thermoplastic laminate film of claim 15, wherein the layer shows an absorbance ratio (X/Y) of not less than 0.05, the X being a peak absorbance at 1778 cm$^{-1}$, which is a characteristic of a carboxylic anhydride group of the acid anhydride in the layer and the Y being a peak absorbance at 1177 cm$^{-1}$, which is a characteristic of an ester group derived from the aliphatic dicarboxylic acid.

17. The thermoplastic laminate film of claim 15, wherein the layer has no adhesion in a adhesive blocking test using chloroform.

18. The thermoplastic laminate film of claim 1, obtained by the steps of:

(a) applying a coating solution on an unoriented or monoaxially oriented thermoplastic film, the coating solution comprising the polyester graft copolymer (A) and the resin (B) comprising at least one member selected from the group consisting of polyurethane resin, an acrylic resin and a vinyl resin, (b) drying the film, (c) monoaxially or biaxially orienting the film, and (d) thermosetting the film.

19. The thermoplastic laminate film of claim 1, wherein the layer comprises a solid content of the resin composition of 0.005 to 5 $g/m^2$.

* * * * *